(12) United States Patent
Vudathu

(10) Patent No.: US 12,105,614 B2
(45) Date of Patent: Oct. 1, 2024

(54) SYSTEMS AND METHODS FOR COLLECTING AND PROCESSING APPLICATION TELEMETRY

(71) Applicant: JPMORGAN CHASE BANK, N.A., New York, NY (US)

(72) Inventor: Raghu Vudathu, Downingtown, PA (US)

(73) Assignee: JPMORGAN CHASE BANK, N.A., New York, NY (US)

(*) Notice: Subject to any disclaimer, the term of this patent is extended or adjusted under 35 U.S.C. 154(b) by 0 days.

(21) Appl. No.: 18/062,365

(22) Filed: Dec. 6, 2022

(65) Prior Publication Data
US 2024/0184682 A1    Jun. 6, 2024

Related U.S. Application Data

(60) Provisional application No. 63/265,013, filed on Dec. 6, 2021.

(51) Int. Cl.
G06F 11/34    (2006.01)
G06F 11/07    (2006.01)
G06F 11/30    (2006.01)

(52) U.S. Cl.
CPC ...... *G06F 11/3466* (2013.01); *G06F 11/0793* (2013.01); *G06F 11/3051* (2013.01); *G06F 11/3075* (2013.01)

(58) Field of Classification Search
CPC ............. G06F 11/3466; G06F 11/0793; G06F 11/3051; G06F 11/3075
USPC ........................................................ 709/204
See application file for complete search history.

(56) References Cited

U.S. PATENT DOCUMENTS

| 10,346,284 | B1 * | 7/2019 | Yang | G06F 9/451 |
| 10,732,852 | B1 * | 8/2020 | Ma | G06F 3/0641 |
| 11,721,133 | B2 * | 8/2023 | Bruce | G07C 5/006 |
| | | | | 701/31.4 |

(Continued)

OTHER PUBLICATIONS

International Search Report and Written Opinion of the International Searching Authority, dated Apr. 14, 2023, from corresponding International Application No. PCT/US2022/081007.

*Primary Examiner* — Tauqir Hussain
(74) *Attorney, Agent, or Firm* — GREENBERG TRAURIG LLP

(57) ABSTRACT

A method for collecting and processing application telemetry may include: collecting, by a telemetry insights computer program, first telemetry data from computer applications, network appliances, and hardware devices in a distributed architecture; generating, by the telemetry insights computer program and based on the first telemetry data, a CPU operating service level, a memory operating service level, and a latency service level; collecting, by the telemetry insights computer program, second telemetry data from the computer applications, the network appliances, and the hardware devices; identifying, by the telemetry insights computer program, an anomaly by comparing the second telemetry data to the CPU operating service level, the memory operating service level, and the latency service level; generating, by the telemetry insights computer program, an event for the anomaly and communicating the event to an event manager; and executing, by the event manager, an automated proactive action in response to the anomaly.

17 Claims, 3 Drawing Sheets

(56) References Cited

U.S. PATENT DOCUMENTS

| | | | |
|---|---|---|---|
| 2015/0269050 A1* | 9/2015 | Filimonov | G06Q 10/0639 |
| | | | 702/183 |
| 2016/0020964 A1* | 1/2016 | Eggleston | H04L 43/026 |
| | | | 709/224 |
| 2017/0206482 A1* | 7/2017 | Crow | G06Q 20/4015 |
| 2018/0322437 A1* | 11/2018 | McClory | G06F 8/30 |
| 2020/0136994 A1* | 4/2020 | Doshi | H04L 47/822 |
| 2020/0412622 A1* | 12/2020 | Sherwood | H04L 43/08 |
| 2021/0152435 A1* | 5/2021 | Poteat | H04L 41/16 |
| 2021/0263779 A1* | 8/2021 | Haghighat | G06F 9/5061 |
| 2021/0279632 A1* | 9/2021 | Di Pietro | G06N 5/04 |
| 2021/0374027 A1* | 12/2021 | Joglekar | G06F 11/076 |
| 2021/0406146 A1* | 12/2021 | Lange | G06F 11/3409 |
| 2022/0222144 A1* | 7/2022 | Li | G06F 11/1435 |
| 2022/0253699 A1* | 8/2022 | Hoshen | G06N 3/08 |
| 2022/0319239 A1* | 10/2022 | Bruce | G06F 11/3013 |
| 2023/0045896 A1* | 2/2023 | Malik | G06F 9/5077 |
| 2023/0066504 A1* | 3/2023 | Daha | H04N 5/265 |
| 2023/0071833 A1* | 3/2023 | Chen | B60W 50/0205 |
| 2023/0081673 A1* | 3/2023 | Junkins | H04W 28/0268 |
| | | | 370/235 |
| 2023/0082301 A1* | 3/2023 | Junkins | H04W 24/08 |
| | | | 455/423 |
| 2023/0084355 A1* | 3/2023 | Junkins | H04M 15/00 |
| | | | 370/329 |
| 2023/0135691 A1* | 5/2023 | Rohrkemper | H05K 7/20136 |
| | | | 700/300 |
| 2023/0168986 A1* | 6/2023 | Larkin | G06F 11/302 |
| | | | 717/127 |
| 2023/0188414 A1* | 6/2023 | Kotalwar | H04L 41/0816 |
| | | | 370/254 |
| 2023/0213925 A1* | 7/2023 | Jeromin | G05B 23/0243 |
| | | | 700/29 |

* cited by examiner

SYSTEMS AND METHODS FOR COLLECTING AND PROCESSING APPLICATION TELEMETRY

RELATED APPLICATIONS

This application claims priority to, and the benefit of, U.S. Provisional Patent Application Ser. No. 63/265,013, filed Dec. 6, 2021, the disclosure of which is hereby incorporated, by reference, in its entirety.

BACKGROUND OF THE INVENTION

1. Field of the Invention

Embodiments generally relate to systems and methods for collecting and processing application telemetry.

2. Description of the Related Art

Many business-critical legacy applications in an organization are monolith applications. Recently, the use of distributed architectures using cloud-native technologies like microservices, API's and event driven architecture have increased in popularity. Moving to cloud-native technologies and distributed architecture introduces challenges around speed, scale, and complexity of data—challenges that traditional monitoring solutions were not designed to handle.

The monitoring of systems is not new; there is, however, a difference between monitoring monolithic applications and distributed systems. This is where observability comes in. Observable systems help identify issues quickly, which is critical when meeting the service-level objectives (SLOs) and indicators (SLIs).

In a distributed architecture, the number of deployable components, infrastructure, and telemetry data from all the systems increases significantly. Even though problems can be detected, the ability to determine why they occur is getting harder with the introduction of microservices in the distributed architecture. Engineers are spending more time diagnosing problems, navigating heterogeneous monitoring tools and in-consistent dashboards.

The collection of Application Performance Management (APM) data depends on a variety of APM tools with a few major ones. The lack of standardization with respect to tools, dashboards, patterns, and frameworks, to collect, visualize and organize telemetry data consistently across different systems and products, makes it impossible to achieve efficiency, which results in higher diagnostic times (Mean Time to Detect, MTTD) and repair times (MTR/MTTR) significantly.

SUMMARY OF THE INVENTION

Systems and methods for collecting and processing application telemetry are disclosed. In one embodiment, a method for collecting and processing application telemetry may include: (1) collecting, by a telemetry insights computer program, first telemetry data from computer applications, network appliances, and hardware devices in a distributed architecture; (2) generating, by the telemetry insights computer program and based on the first telemetry data, a central processing unit (CPU) operating service level, a memory operating service level, and a latency service level; (3) collecting, by the telemetry insights computer program, second telemetry data from the computer applications, the network appliances, and the hardware devices; (4) identifying, by the telemetry insights computer program, an anomaly by comparing the second telemetry data to the CPU operating service level, the memory operating service level, and the latency service level; (5) generating, by the telemetry insights computer program, an event for the anomaly and communicating the event to an event manager; and (6) executing, by the event manager, an automated proactive action in response to the anomaly.

In one embodiment, the first telemetry data and the second telemetry data are collected from monitoring agents associated with the computer applications, the network appliances, and the hardware devices.

In one embodiment, the first telemetry data and the second telemetry data comprise logs, traces, metrics, and metadata.

In one embodiment, the method may also include pre-processing, by the telemetry insights computer program, the first telemetry data and the second telemetry data, wherein the pre-processing comprises transforming the first telemetry data and the second telemetry data to a common format, cleansing the first telemetry data and the second telemetry data, and consolidating the first telemetry data and the second telemetry data.

In one embodiment, the CPU operating service level, the memory operating service level, and the latency service level are generated periodically using the first telemetry data collected since a prior generation of the CPU operating service level, the memory operating service level, and the latency service level.

In one embodiment, the method may also include generating, by the telemetry insights computer program, a predictive insight for the second telemetry data using a trained machine learning engine, wherein the predictive insight identifies a predicted failure associated with the anomaly.

In one embodiment, the automated proactive action may include comprises automated healing, automated scaling, or automated disabling.

In one embodiment, the method may also include: periodically persisting, by the telemetry insights computer program, the second telemetry data; and generating, by the telemetry insights computer program, a long-term insight from the persisted second telemetry data using a trained machine learning engine.

According to another embodiment, a system may include: a plurality of computer applications, each comprising a computer application monitoring agent; a plurality of network applications, each comprising a network application monitoring agent; a plurality of hardware devices, each comprising a hardware device monitoring agent; a telemetry insights computer program executed by an electronic device that receives first telemetry data from the computer application monitoring agents, the network application monitoring agents, and the hardware device monitoring agents; generates, based on the first telemetry data, a central processing unit (CPU) operating service level, a memory operating service level, and a latency service level; collects second telemetry data from the computer application monitoring agents, the network application monitoring agents, and the hardware device monitoring agents; identifies an anomaly by comparing the second telemetry data to the CPU operating service level, the memory operating service level, and the latency service level; and generates an event for the anomaly; and an event manager computer program executed by the electronic device that receives the event and executes an automated proactive action in response to the anomaly.

In one embodiment, the first telemetry data and the second telemetry data comprise logs, traces, metrics, and metadata.

In one embodiment, the telemetry insights computer program further pre-processes the first telemetry data and the second telemetry data, wherein the pre-processing transforms the first telemetry data and the second telemetry data to a common format, cleanses the first telemetry data and the second telemetry data, and consolidates the first telemetry data and the second telemetry data.

In one embodiment, the telemetry insights computer program periodically generates the CPU operating service level, the memory operating service level, and the latency service level using the first telemetry data collected since a prior generation of the CPU operating service level, the memory operating service level, and the latency service level.

In one embodiment, the telemetry insights computer program generates a predictive insight for the second telemetry data using a trained machine learning engine, wherein the predictive insight identifies a predicted failure associated with the anomaly.

In one embodiment, the automated proactive action comprises automated healing, automated scaling, or automated disabling.

In one embodiment, the telemetry insights computer program periodically persists the second telemetry data and generates a long-term insight from the persisted second telemetry data using a trained machine learning engine.

According to another embodiment, a non-transitory computer readable storage medium, including instructions stored thereon, which when read and executed by one or more computer processors, cause the one or more computer processors to perform steps comprising: collecting first telemetry data from computer applications, network appliances, and hardware devices in a distributed architecture, wherein the first telemetry data are collected from monitoring agents associated with the computer applications, the network appliances, and the hardware devices; generating, based on the first telemetry data, a central processing unit (CPU) operating service level, a memory operating service level, and a latency service level; collecting second telemetry data from the computer applications, the network appliances, and the hardware devices, wherein the second telemetry data are collected from the monitoring agents associated with the computer applications, the network appliances, and the hardware devices; identifying an anomaly by comparing the second telemetry data to the CPU operating service level, the memory operating service level, and the latency service level; generating an event for the anomaly and communicating the event to an event manager; and executing an automated proactive action in response to the anomaly.

In one embodiment, the non-transitory computer readable storage medium may also include instructions stored thereon, which when read and executed by one or more computer processors, cause the one or more computer processors to pre-process the first telemetry data and the second telemetry data, wherein the pre-processing comprises transforming the first telemetry data and the second telemetry data to a common format, cleansing the first telemetry data and the second telemetry data, and consolidating the first telemetry data and the second telemetry data.

In one embodiment, the CPU operating service level, the memory operating service level, and the latency service level are generated periodically using the first telemetry data collected since a prior generation of the CPU operating service level, the memory operating service level, and the latency service level.

In one embodiment, the non-transitory computer readable storage medium may also include instructions stored thereon, which when read and executed by one or more computer processors, cause the one or more computer processors to generate a predictive insight for the second telemetry data using a trained machine learning engine, wherein the predictive insight identifies a predicted failure associated with the anomaly, wherein the automated proactive action comprises automated healing, automated scaling, or automated disabling.

In one embodiment, the non-transitory computer readable storage medium may also include instructions stored thereon, which when read and executed by one or more computer processors, cause the one or more computer processors to periodically persist the second telemetry data and to generate a long-term insight from the persisted second telemetry data using a trained machine learning engine.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF PREFERRED EMBODIMENTS

Figure 1:
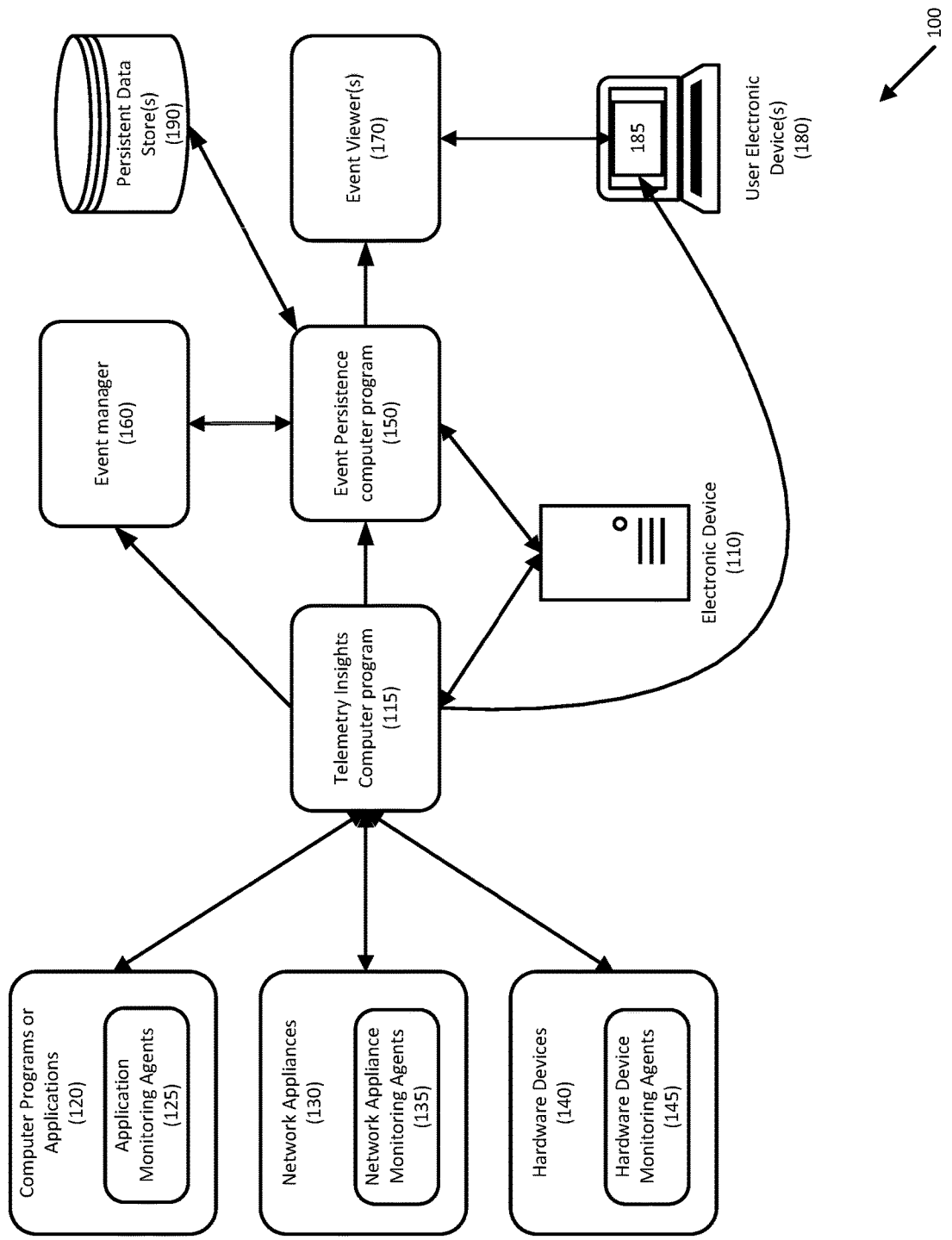
FIG. 1 depicts a system for collecting and processing application telemetry according to an embodiment.

Embodiments are directed to systems and methods for collecting and processing application telemetry.

Embodiments may reduce the MTTD for all distributed applications. For example, embodiments may identify the root cause of an issue during an incident and may provide data to help understand or identify the application, system, Application Programming Interface (API) and/or the appliance that is causing the problem.

Embodiments may provide end-to-end visibility of a customer request (e.g., who is performing a certain action or using a business feature) across application boundaries (e.g., across product flow), including visibility into components that the application owner does not own (e.g., cloud services or components, third parties, supporting upstream systems, supporting downstream systems, etc.).

Embodiments may provide early detection and near real time prediction of a system degrading based on the telemetry data.

Embodiments may provide support for legacy applications. For example, embodiments may identify critical legacy applications that need to be instrumented irrespective of the status (maintain/divest), and instrument the applications.

Embodiments may provide a standard prescription for developers to consistently follow on how to instrument applications, including legacy and modern applications, during development—"developer to-do for telemetry."

Embodiments may publish insights to product teams, architects, engineers, etc. on the feature usage, to drive business and/or technical decisions on building new features, enhancements and decommissioning existing services.

Embodiments may be proactive instead of reactive, and may detect trends proactively and act in advance than reacting to the incident after the system stopped working.

Embodiments may generate alerts proactively before the system degrades or when it shows the signs of degradation.

Embodiments may use open standards-based frameworks (e.g., OpenTelemetry, OpenTracing, OpenCensus, etc.) to prevent vendor lock-ins.

Embodiments may use shift-left observability and telemetry during development. Developers may see the same exact data that they would see during an incident (e.g., logs, metrics, dashboards, etc.) and validate in lower environments during development.

Embodiments may provide the ability for development teams to set up thresholds to receive appropriate notification, including soft alerts (e.g., when the system performance is degrading) and hard alerts (e.g., when the system is no longer responding), etc. Alerts may be provided in real time.

Embodiments may provide consistent dashboards for every application, "out of the box", without any additional work. Teams/engineers may build custom dashboards for special use cases or needs as is necessary and/or required.

Embodiments may instrument an application with agents, such as home grown, open-source, or commercial agents, or agentless frameworks with minimal coding and custom implementation. In one embodiment, low code or no code programing techniques may be used.

Embodiments may provide the ability to trace and track all requests, from all customers, all the time, to identify, and measure the performance of the systems (SLI's and SLO's).

Embodiments may provide the ability to tag every customer request with an immutable unique id (e.g., a trace-id) and send it to every system that the request traverses in order to fulfill the customer request. For example, the request may be provided to all the downstream systems starting with the system where the customer request originated.

Embodiments may provide the ability for every system involved in the customer flow to add metadata (e.g., application id, environment, API name, microservice name, application name, IP address, host name, etc.) so insights can be derived from the metadata.

Embodiments may provide the ability to capture consistent metrics (e.g., golden signals, such as latency, error rate, traffic, saturation) from all the systems involved in the customer flow.

Embodiments may provide observability may be based on customer, flows, customer journeys, etc. and not just independent applications.

Embodiments may generate insights based on artificial intelligence and/or machine learning predictive analytics models that may constantly evaluate data in real-time or near real-time. Notifications may be predicted and provided during the degradation process instead of after the degradation process.

Embodiments may generate and auto-configure alerts (e.g., soft and hard) at various times pre, during and post degradation process.

Embodiments may provide a birds-eye view of the overall health of distributed systems with custom dashboards.

Referring to FIG. 1, a system for collecting and processing application telemetry is disclosed according to an embodiment. System 100 may include electronic device 110, which may any suitable electronic device, including servers (e.g., physical and/or cloud-based), computers (e.g., workstations, desktops, laptops, notebooks, tablets, etc.), smart devices (e.g., smart phones, smart watches, etc.), Internet of Things (IOT) appliances, etc.

Electronic device 110 may execute telemetry insights computer program 115, which may collect telemetry from application monitoring agents 125 for computer programs or applications 120, network appliance monitoring agents 135 from network appliances 130, and hardware monitoring device agents 145 for hardware devices 140. Application monitoring agents 125 may monitor application telemetry from one or more computer programs or applications 120. Network appliance monitoring agents 135 may monitor network telemetry from network appliances 130, such as hubs, routers, switches, etc. And hardware device monitoring agents 145 may monitor telemetry from hardware devices 140 within the network, such as central processing units, memory, storage, etc.

In one embodiment, telemetry insights computer program 115 may be provided in a data stream between computer programs or applications 120, network appliances 130, and devices 140 and event persistence computer program 150. The application telemetry, network telemetry, and hardware telemetry may be received and processed by telemetry insights computer program 115. Telemetry insights computer program 115 may determine an operating service level provided by computer programs or applications 120, network appliances 130, and hardware devices 140. The operating service level may monitor, for example, CPU usage, memory usage, latency, etc. In one embodiment, the operating service level may be periodically determined based on real-time data flow (e.g., the operating service level may be calculated every five minutes, or some configurable time interval, based on telemetry received in the preceding five minutes).

Telemetry insights computer program 115 may be a single stream or multiple streams, or a single program or multiple programs.

Telemetry insights computer program 115 may transform, format, cleanse, and consolidate telemetry data as it is received. Telemetry insights computer program 115 may receive telemetry data in various formats and it may enrich and normalize to a standard format to make it efficient for machine learning (ML) models or programs to train and learn from the data.

Once the operating service level is identified, telemetry insights computer program 115 may monitor incoming telemetry data for anomalies. Once an anomaly is identified, telemetry insights computer program 115 may generate and communicate an event to event manager 160. It may also output an event, information, etc. related to the processing of the telemetry to user interface 185 (e.g., an application, a browser, etc.) executed by user electronic device 180 using any suitable network (e.g., LANs, WANs, the Internet, combinations, etc.). Although only one user electronic device is depicted in FIG. 1, it should be understood that more than one user electronic device 180 may be provided.

User electronic device 180 may include, for example, computers (e.g., workstations, desktops, laptops, notebooks, tablets, etc.), smart devices (e.g., smart phones, smart watches, etc.), Internet of Things (IOT) appliances, etc.

Telemetry insights computer program 115 may also output the telemetry data to event persistence computer program 150, which may identify longer-term operating service levels from the telemetry (e.g., minutes, hourly, daily, weekly, monthly, yearly, etc.). Event persistence computer program 150 may also be executed by electronic device 110.

Event persistence computer program 150 may persist the telemetry at an application level, at a network level, and at a hardware level. To persist telemetry data, event persistence computer program 150 may use one or more persistent data stores 190 to store different types of telemetry data. For example, event persistence computer program 150 may use a time series persistent store to store metrics, a SQL or a No SQL database to store logs, a graph database to store traces, and any other persistent store that may be suitable for the purpose.

Event persistence computer program 150 may output events to event manager 160, which may also be executed by electronic device 110. Events may occur in response to an anomaly. Event manager 160 may receive the event and may take an action, such as automated healing (e.g., transfer the application to a new or different cloud in response to an anticipated cloud failure), automated scaling (e.g., spin up a new platform in response to high CPU usage), reacting (e.g., disable a region or hardware in response to a failure), etc. Event manager 160 may also generate longer time insights based on the event data received.

Event viewer 170 may provide user interface 185 with the ability to view an event at, for example, the application level, the network level, and/or the hardware level. Event viewer 170 may also present consolidated event data based on a combination of two or more of the application level, network level, and hardware level.

Figure 2:
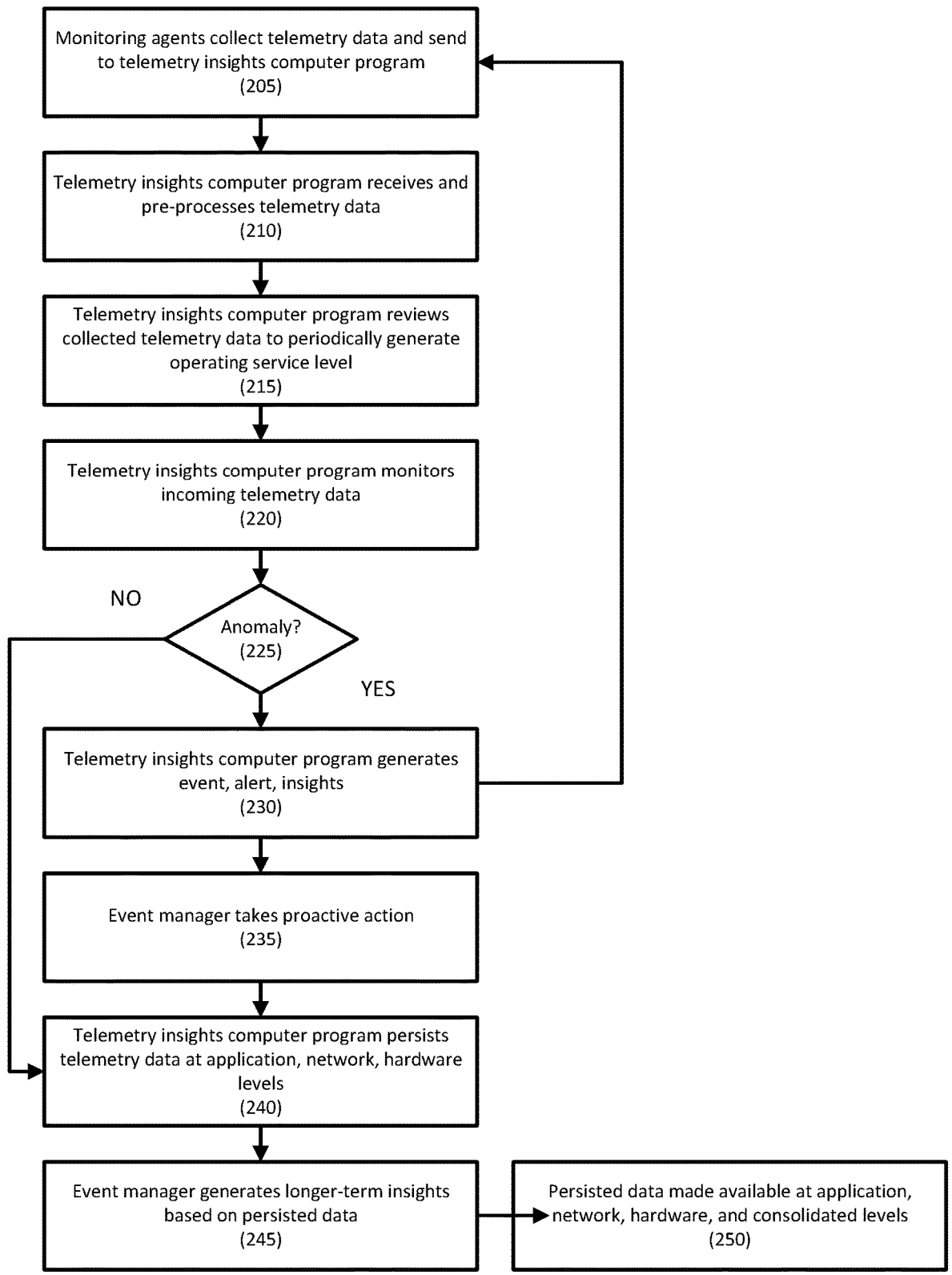
FIG. 2 depicts a method for collecting and processing application telemetry according to an embodiment.

Referring to FIG. 2, a method for collecting and processing application telemetry is disclosed according to an embodiment.

In step 205, telemetry data, such as logs, traces, metrics, metadata, etc. may be collected from all applications, network appliances, hosts, etc. in a distributed architecture. In one embodiment, monitoring agents, such as computer program or application monitoring agents, network appliance monitoring agents, hardware device monitoring agents, etc. may collect the telemetry data and provide the telemetry data to a telemetry insights computer program.

In one embodiment, the telemetry data may be collected in an open standard format. If any of the applications, network appliances, hosts, etc. do not publish telemetry data in the open standard format, a translator may be provided to translate the telemetry data into the open standard format.

In one embodiment, the telemetry data may be streamed to the telemetry insights computer program.

In step 210, the telemetry insights computer program may receive the telemetry data, and may pre-process the telemetry data. For example, the telemetry insights computer program may transform the telemetry data to a common format, may format the telemetry data, may cleanse the telemetry data, may enrich the data, and may consolidate the telemetry data.

In step 215, the telemetry insights computer program may review the collected telemetry data and may generate an operating service level for CPU, memory, latency, etc. In embodiment, the operating service level may be generated periodically, such as every five minutes, based on data received since the prior operating service level was generated.

In one embodiment, the telemetry insights computer program may train one or more machine learning models using the data generated by data systems. For example, telemetry insights computer program may use mathematical models of data to help a computer learn without explicit or direct instructions. This enables the program to learn and improve on its own, based on the experience. The trained machine learning models may review the collected telemetry data that may be received in a standard format or different formats from each program/application/device/appliance/database and constantly adjust the baseline SLO's, SLI's, performance indicators, resource metrics etc. for each program/application/device/appliance/database.

In step 220, the telemetry insights computer program may continue to monitor telemetry data as it is received.

In step 225, the telemetry insights computer program may compare the incoming telemetry data to the operating service level to identify an anomaly. If an anomaly is identified, such as the incoming telemetry data being outside the scope of the operating service level, in step 230, the telemetry insights computer program may generate an event and may communicate the event to an event manager.

The telemetry insights computer program may also generate a predictive insight using, for example, a trained machine learning engine. The predictive insight may identify a predicted failure associated with the anomaly. For example, artificial intelligence may be used with the trained machine learning models to evolve the system. Artificial intelligence may be used for predictive maintenance (e.g., sending alerts and reacting to alerts, auto healing systems, etc.) to establish the baselines for each program, API, hardware component, network appliance, device metric (e.g., CPU, memory, bandwidth, limits) etc.

In addition, the telemetry insights computer program may generate an alert and may notify the appropriate individuals, such as application developer engineers, site reliability engineering (SRE) engineers, production support engineers, etc. to act and avoid an undesired impact, such as a customer impact.

In step 235, the event manager may receive the event and may take a proactive action, automated healing (e.g., transfer the application to a new or different cloud in response to an anticipated cloud failure), automated scaling (e.g., spin up a new platform in response to high CPU usage), reacting (e.g., disable a region or hardware in response to a failure), etc.

In step 240, the telemetry insights computer program may persist data at application, network, and hardware levels.

In step 245, the event manager may generate longer-term insights based on persisted data using the trained machine learning engine above, or a different trained machine algorithm. Using one or more of these machine learning engines, the telemetry insights computer program may generate short term insights and notify users if and when the system is degrading. On the other hand, the intent and purpose of the algos in step 245 is to generate long term insights for data more than an hour, day, week, month, year etc.

In step 250, the persisted data is made available at application, network, hardware, and consolidated levels. For example, in one embodiment, based on the collected data, visualizations may be generated manually on-demand or automatically based on the raw data in the persistent store. The visualization may span across data centers, clouds, and servers, to give a transactional view of the customer request to the application developer engineers, system engineers, and production support engineers. The visualizations may provide the ability to correlate data between logs, traces, and metrics using the metadata to detect the issue or investigate the issue in very short duration.

In embodiments, past events, notifications, etc. may be made available as necessary and/or desired.

Figure 3:
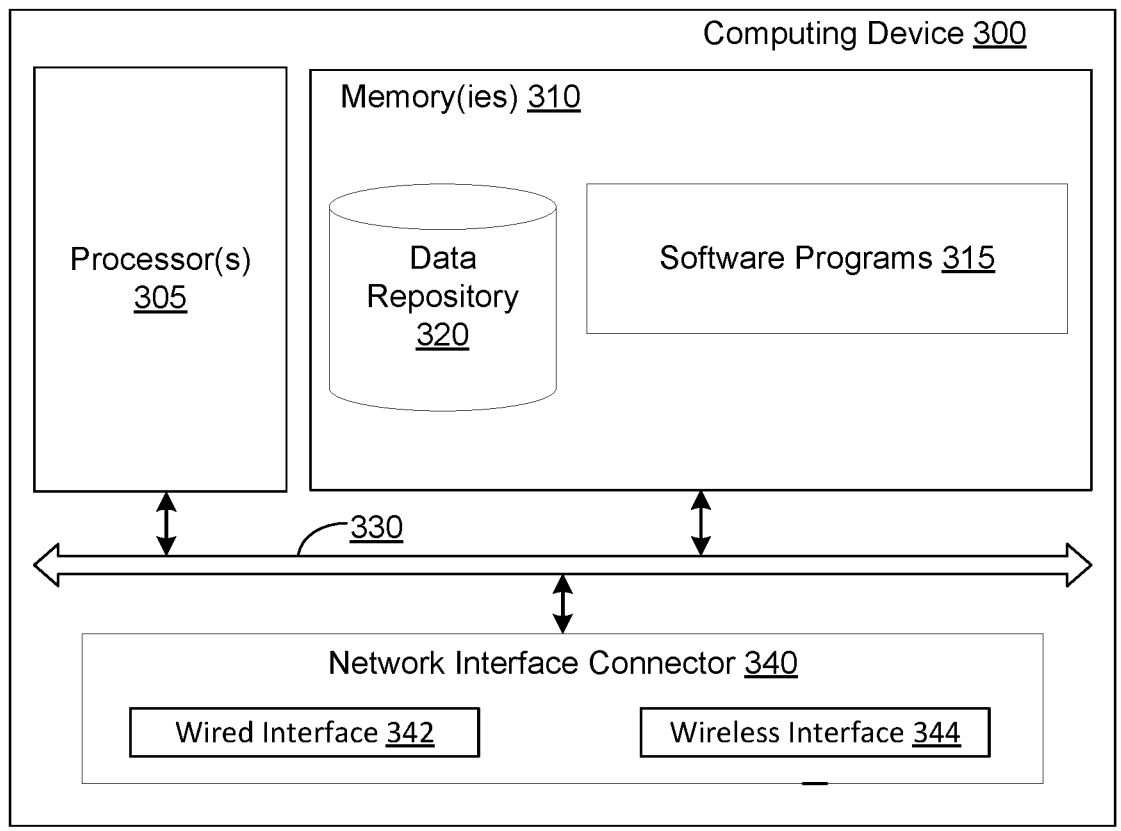
FIG. 3 depicts an exemplary computing system for implementing aspects of the present disclosure.

FIG. 3 depicts an exemplary computing system for implementing aspects of the present disclosure. FIG. 3 depicts exemplary computing device 300. Computing device 300 may represent the system components described herein. Computing device 300 may include processor 305 that may be coupled to memory 310. Memory 310 may include volatile memory. Processor 305 may execute computer-executable program code stored in memory 310, such as software programs 315. Software programs 315 may include one or more of the logical steps disclosed herein as a programmatic instruction, which may be executed by processor 305. Memory 310 may also include data repository 320, which may be nonvolatile memory for data persistence. Processor 305 and memory 310 may be coupled by bus 330. Bus 330 may also be coupled to one or more network interface connectors 340, such as wired network interface 342 or wireless network interface 344. Computing device 300 may also have user interface components, such as a screen for displaying graphical user interfaces and receiving input from the user, a mouse, a keyboard and/or other input/output components (not shown).

Although several embodiments have been disclosed, it should be recognized that these embodiments are not exclusive to each other, and features from one embodiment may be used with others.

Hereinafter, general aspects of implementation of the systems and methods of embodiments will be described.

Embodiments of the system or portions of the system may be in the form of a "processing machine," such as a general-purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

In one embodiment, the processing machine may be a cloud-based processing machine, a physical processing machine, or combinations thereof.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement embodiments may be a general-purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA (Field-Programmable Gate Array), PLD (Programmable Logic Device), PLA (Programmable Logic Array), or PAL (Programmable Array Logic), or any other device or arrangement of devices that is capable of implementing the steps of the processes disclosed herein.

The processing machine used to implement embodiments may utilize a suitable operating system.

It is appreciated that in order to practice the method of the embodiments as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above, in accordance with a further embodiment, may be performed by a single component. Further, the processing performed by one distinct component as described above may be performed by two distinct components.

In a similar manner, the memory storage performed by two distinct memory portions as described above, in accordance with a further embodiment, may be performed by a single memory portion. Further, the memory storage performed by one distinct memory portion as described above may be performed by two memory portions.

Further, various technologies may be used to provide communication between the various processors and/or memories, as well as to allow the processors and/or the memories to communicate with any other entity; i.e., so as to obtain further instructions or to access and use remote memory stores, for example. Such technologies used to provide such communication might include a network, the Internet, Intranet, Extranet, a LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of embodiments. The set of instructions may be in the form of a program or software. The software may be in the form of system software or application software, for example. The software might also be in the form of a collection of separate programs, a program module within a larger program, or a portion of a program module, for example. The software used might also include modular programming in the form of object-oriented programming. The software tells the processing machine what to do with the data being processed.

Further, it is appreciated that the instructions or set of instructions used in the implementation and operation of embodiments may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments. Also, the instructions and/or data used in the practice of embodiments may utilize any compression or encryption technique or algorithm, as may be desired. An encryption module might be used to encrypt data. Further, files or other data may be decrypted using a suitable decryption module, for example.

As described above, the embodiments may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in embodiments may take on any of a variety of physical forms or transmissions, for example. Illustratively, the medium may be in the form of a compact disc, a DVD, an integrated circuit, a hard disk, a floppy disk, an optical disc, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors.

Further, the memory or memories used in the processing machine that implements embodiments may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the systems and methods, a variety of "user interfaces" may be utilized to allow a user to interface with the processing machine or machines that are used to implement embodiments. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method, it is not necessary that a human user actually interact with a user interface used by the processing machine. Rather, it is also contemplated that the user interface might interact, i.e., convey and receive information, with another processing machine, rather than a human user. Accordingly, the other processing machine might be characterized as a user. Further, it is contemplated that a user interface utilized in the system and method may interact partially with another processing machine or processing machines, while also interacting partially with a human user.

It will be readily understood by those persons skilled in the art that embodiments are susceptible to broad utility and application. Many embodiments and adaptations of the present invention other than those herein described, as well as many variations, modifications and equivalent arrangements, will be apparent from or reasonably suggested by the foregoing description thereof, without departing from the substance or scope.

Accordingly, while the embodiments of the present invention have been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for collecting and processing application telemetry, comprising:
    collecting, by a telemetry insights computer program, first telemetry data from computer applications, network appliances, and hardware devices in a distributed architecture, wherein the distributed architecture comprises a plurality of central processing units (CPUs), a plurality of memories, and a plurality of network connections;
    pre-processing, by the telemetry insights computer program, the first telemetry data by transforming the first telemetry data to a common format, cleansing the first telemetry data, and consolidating the first telemetry data;
    generating, by the telemetry insights computer program and based on the first telemetry data, a first CPU operating service level for the plurality of CPUs in the distributed architecture, a first memory operating service level for the plurality of memories in the distributed architecture, and a first latency service level for the plurality of network connections in the distributed architecture;
    collecting, by the telemetry insights computer program, second telemetry data from the computer applications, the network appliances, and the hardware devices;
    pre-processing, by the telemetry insights computer program, the second telemetry data by transforming the second telemetry data to the common format, cleansing the second telemetry data, and consolidating the second telemetry data;
    identifying, by the telemetry insights computer program, an anomaly by comparing the second telemetry data to the first CPU operating service level, the first memory operating service level, and the first latency service level;
    generating, by the telemetry insights computer program, an event for the anomaly and communicating the event to an event manager; and
    executing, by the event manager, an automated proactive action in response to the anomaly.

2. The method of claim 1, wherein the first telemetry data and the second telemetry data are collected from monitoring agents associated with the computer applications, the network appliances, and the hardware devices.

3. The method of claim 1, wherein the first telemetry data and the second telemetry data comprise logs, traces, metrics, and metadata.

4. The method of claim 1, wherein the first CPU operating service level, the first memory operating service level, and the first latency service level are generated periodically using the first telemetry data collected since a prior generation of the first CPU operating service level, a prior generation of the first memory operating service level, and a prior generation of the first latency service level.

5. The method of claim 1, further comprising:
generating, by the telemetry insights computer program, a predictive insight for the second telemetry data using a trained machine learning engine, wherein the predictive insight identifies a predicted failure associated with the anomaly.

6. The method of claim 1, wherein the automated proactive action comprises automated healing, automated scaling, or automated disabling.

7. The method of claim 1, further comprising:
periodically persisting, by the telemetry insights computer program, the second telemetry data; and
generating, by the telemetry insights computer program, a long-term insight from the persisted second telemetry data using a trained machine learning engine.

8. A system, comprising:
a distributed architecture comprising a plurality of central processing units (CPUs), a plurality of memories, and a plurality of network connections:
a plurality of computer applications, each comprising a computer application monitoring agent;
a plurality of network applications, each comprising a network application monitoring agent; and
a plurality of hardware devices, each comprising a hardware device monitoring agent;
a telemetry insights computer program executed by an electronic device that receives first telemetry data from the computer application monitoring agents, the network application monitoring agents, and the hardware device monitoring agents; pre-processes the first telemetry data by transforming the first telemetry data to a common format, cleansing the first telemetry data, and consolidating the first telemetry data; generates, based on the first telemetry data, a first CPU operating service level for the plurality of CPUs in the distributed architecture, a first memory operating service level for the plurality of memories in the distributed architecture, and a first latency service level for the plurality of network connections in the distributed architecture; collects second telemetry data from the computer application monitoring agents, the network application monitoring agents, and the hardware device monitoring agents; pre-processes the second telemetry data by transforming the second telemetry data to the common format, cleansing the second telemetry data, and consolidating the second telemetry data; identifies an anomaly by comparing the second telemetry data to the first CPU operating service level, the first memory operating service level, and the first latency service level; and generates an event for the anomaly; and
an event manager computer program executed by the electronic device that receives the event and executes an automated proactive action in response to the anomaly.

9. The system of claim 8, wherein the first telemetry data and the second telemetry data comprise logs, traces, metrics, and metadata.

10. The system of claim 8, wherein the telemetry insights computer program periodically generates the first CPU operating service level, the first memory operating service level, and the first latency service level using the first telemetry data collected since a prior generation of the first CPU operating service level, a prior generation of the first memory operating service level, and a prior generation of the first latency service level.

11. The system of claim 8, wherein the telemetry insights computer program generates a predictive insight for the second telemetry data using a trained machine learning engine, wherein the predictive insight identifies a predicted failure associated with the anomaly.

12. The system of claim 8, wherein the automated proactive action comprises automated healing, automated scaling, or automated disabling.

13. The system of claim 8, wherein the telemetry insights computer program periodically persists the second telemetry data and generates a long-term insight from the persisted second telemetry data using a trained machine learning engine.

14. A non-transitory computer readable storage medium, including instructions stored thereon, which when read and executed by one or more computer processors, cause the one or more computer processors to perform steps comprising:
collecting first telemetry data from computer applications, network appliances, and hardware devices in a distributed architecture, wherein the distributed architecture comprises a plurality of central processing units (CPUs), a plurality of memories, and a plurality of network connections and wherein the first telemetry data are collected from monitoring agents associated with the computer applications, the network appliances, and the hardware devices;
pre-processing the first telemetry data by transforming the first telemetry data to a common format, cleansing the first telemetry data, and consolidating the first telemetry data;
generating, based on the first telemetry data, a first CPU operating service level for the plurality of CPUs in the distributed architecture, a first memory operating service level for the plurality of memories in the distributed architecture, and a first latency service level for the plurality of network connections in the distributed architecture;
collecting second telemetry data from the computer applications, the network appliances, and the hardware devices, wherein the second telemetry data are collected from the monitoring agents associated with the computer applications, the network appliances, and the hardware devices;
pre-processing the second telemetry data by transforming the second telemetry data to the common format, cleansing the second telemetry data, and consolidating the second telemetry data;
identifying an anomaly by comparing the second telemetry data to the first CPU operating service level, the first memory operating service level, and the first latency service level;
generating an event for the anomaly and communicating the event to an event manager; and
executing an automated proactive action in response to the anomaly.

15. The non-transitory computer readable storage medium of claim 14, wherein the first CPU operating service level, the first memory operating service level, and the first latency service level are generated periodically using the first telemetry data collected since a prior generation of the first CPU operating service level, a prior generation of the first memory operating service level, and a prior generation of the first latency service level.

16. The non-transitory computer readable storage medium of claim 14, further comprising instructions stored thereon, which when read and executed by one or more computer processors, cause the one or more computer processors to generate a predictive insight for the second telemetry data using a trained machine learning engine, wherein the predictive insight identifies a predicted failure associated with the anomaly, wherein the automated proactive action comprises automated healing, automated scaling, or automated disabling.

17. The non-transitory computer readable storage medium of claim 14, further comprising instructions stored thereon, which when read and executed by one or more computer processors, cause the one or more computer processors to periodically persist the second telemetry data and to generate a long-term insight from the persisted second telemetry data using a trained machine learning engine.

* * * * *